United States Patent [19]

Vance

[11] Patent Number: 4,740,070

[45] Date of Patent: Apr. 26, 1988

[54] OPTICAL FILTER

[75] Inventor: Jeffrey D. Vance, Barberton, Ohio

[73] Assignee: PPG Industries, Inc., Pittsburgh, Pa.

[21] Appl. No.: 926,604

[22] Filed: Nov. 4, 1986

Related U.S. Application Data

[62] Division of Ser. No. 617,425, Jun. 5, 1984, Pat. No. 4,650,605.

[51] Int. Cl.$^4$ ............................ G02C 7/02; G02B 5/22
[52] U.S. Cl. ..................................... 351/163; 350/311; 350/438; 351/159; 252/589
[58] Field of Search ............... 252/589, 588, 582, 600; 350/311, 438; 351/161, 159, 163; 623/6

[56] References Cited

U.S. PATENT DOCUMENTS

| | | | |
|---|---|---|---|
| 1,886,237 | 11/1932 | Rogers et al. | |
| 2,003,859 | 6/1935 | Lee | 260/58 |
| 3,309,220 | 3/1967 | Osteen | 252/589 |
| 3,382,183 | 5/1968 | Donoran et al. | 252/589 |
| 3,574,128 | 4/1971 | King | 252/589 |
| 3,826,751 | 7/1974 | Laliberte | 252/589 |
| 4,043,637 | 8/1977 | Hovey | 252/300 |
| 4,297,267 | 10/1981 | Leatherman | 252/582 |
| 4,304,895 | 12/1981 | Loshaek | 526/313 |
| 4,381,136 | 4/1983 | Hosch et al. | 350/1.1 |
| 4,553,975 | 11/1985 | Su | 351/162 X |
| 4,559,059 | 12/1985 | Su | 351/162 X |
| 4,562,600 | 1/1986 | Ginsberg | 623/6 |
| 4,636,212 | 1/1987 | Posin | 252/588 X |
| 4,643,537 | 2/1987 | Vance | 252/582 X |

FOREIGN PATENT DOCUMENTS

| | | |
|---|---|---|
| 0035063 | 9/1981 | European Pat. Off. ............ 252/589 |
| 131468 | 1/1985 | European Pat. Off. . |

OTHER PUBLICATIONS

Ham, Jr., "Ocular Hazards . . .", Jour. Occup. Medic, vol. 25, No. 2, Feb. 1983, 101–103.
Colour Index, vol. 4, p. 4515, 3rd Ed. (1971).

*Primary Examiner*—John F. Terapane
*Assistant Examiner*—Catherine S. Kilby
*Attorney, Agent, or Firm*—Irwin M. Stein

[57] ABSTRACT

Polyol(allyl carbonate) monomer, e.g., diethylene glycol bis(allyl carbonate), containing 1,4-dihydroxy anthraquinone in amounts sufficient to selectively absorb at least 94 percent of the visible and ultraviolet light segments of the electromagnetic spectrum below 530 nanometers is described. Also described are ophthalmic articles prepared by curing the monomer.

7 Claims, 3 Drawing Sheets 4,740,070

OPTICAL FILTER

This is a division of application Ser. No. 617,425, filed June 5, 1984, now U.S. Pat. No. 4,650,605.

DESCRIPTION OF THE INVENTION

Ophthalmic lenses typically transmit high levels of ultraviolet radiation. Recently, concern has been expressed that ultraviolet radiation may be potentially harmful to the eye. In addition, there are many individuals who are particularly sensitive to radiation in the lower portion of the visible spectrum, e.g., between about 400 and 550 nanometers as a result of ocular conditions such as cataracts.

The use of chemical additives as internal filters for ophthalmic plastic lenses poses several difficulties. Firstly, the chemical additive must be soluble in the organic monomer used to produce the solid plastic lens. Secondly, since polymerization of the organic monomer is initiated by free-radical initiators, e.g., peroxide initiators, the additive must be resistant to oxidation caused by the peroxide initiator during polymerization. Thirdly, the additive must also be resistant to thermal degradation brought about by the elevated temperatures used during polymerization. Finally, the chemical additive must not adversely affect the polymerization process, in a significant way, i.e., severely inhibit the cure or castability of the monomer, or adversely affect the physical properties, e.g., the hardness, refractive index, clarity, etc. of the polymerizate.

There has, therefore, been a continuing search for organic chemical additives that are soluble in the organic monomer used to produce the plastic ophthalmic article, are stable to peroxide initiators and thermal degradation, do not adversely affect the physical properties of the cured plastic article and which impart to the cured plastic article the property of selectively absorbing ultraviolet light and visible light in the lower portion of the visible region of the electromagnetic spectrum, e.g., up to about 530 or 550 nanometers.

It has now been discovered that polymerizates of polyol(allyl carbonate) monomers that contain an effective amount of 1,4-dihydroxy anthraquinone selectively absorb at least 94 percent of the ultraviolet and visible light segments of the electromagnetic spectrum below the wavelength of 530 nanometers. More particularly, it has been discovered that poly[polyol(allyl carbonate)], e.g., diethylene glycol bis(allyl carbonate), that contains from above 0.05 to about 0.40 weight percent of 1,4-dihydroxy anthraquinone selectively absorbs that portion of the electromagnetic spectrum through 530 nanometers, which includes the potentially harmful ultraviolet light portion of the electromagnetic spectrum and the lower portion of the visible light spectrum, e.g., the blue segment, which are believed to be the primary causes of discomfort for individuals with ocular conditions, such as that previously described.

BRIEF DESCRIPTION OF THE DRAWINGS

The present invention will be more fully understood by reference to the attached drawings wherein.

DETAILED DESCRIPTION OF THE INVENTION

Figure 1:
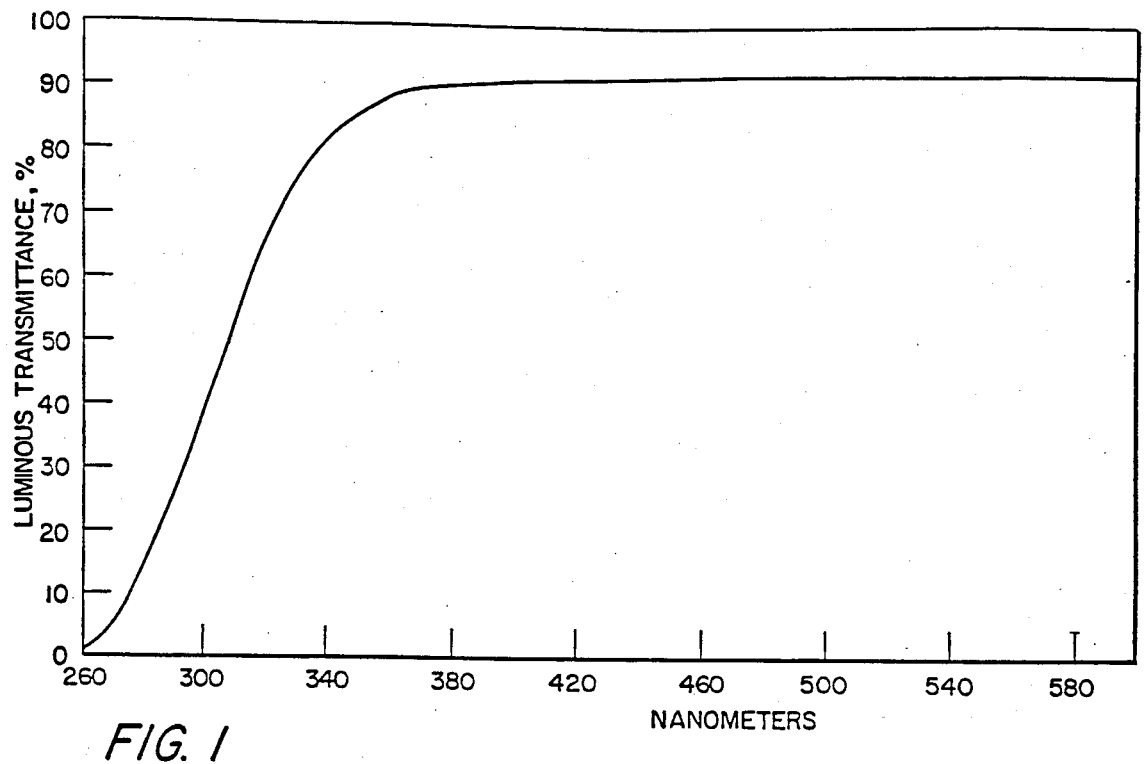
FIG. 1 is a plot of the percent light transmittance against wavelength for the electromagnetic spectrum from about 260 to 600 nanometers for poly[diethylene glycol bis(allyl carbonate)] containing no organic light filtering additive.

In accordance with the present invention, there is provided an optical filter of poly[polyol(allyl carbonate)] that is capable of selectively absorbing at least 94 percent of the ultraviolet and visible light segments of the electromagnetic spectrum below the wavelength of 530 nanometers. The aforesaid optical filter is obtained by dissolving in the liquid polyol(allyl carbonate) monomer an effective amount of 1,4-dihydroxy anthraquinone additive and polymerizing the resulting solution.

1,4-dihydroxy anthraquinone is available commercially. It is often referred to by its classical name, quinizarin, and is listed in the Colour Index, Volume 4, page 4515, third edition (1971) as number 58050 smoke dye (orange). U.S. Pat. No. 1,886,237 describes the preparation of 1,4-dihydroxy anthraquinone by the condensation of 4-chlorophenol with phthalic anhydride in the presence of anhydrous aluminum chloride. The composite product produced by the condensation reaction is subjected to ring closure and hydrolysis to produce the desired dihydroxy product. U.S. Pat. No. 2,003,859 describes the condensation of phthalic anhydride and p-chlorophenol in concentrated sulfuric acid in the presence of boric acid to produce quinizarin. The Colour Index refers to three other methods for producing 1,4-dihydroxy anthraquinone among which is the treatment of anthraquinone with sulfuric acid in the presence of boric acid.

The amount of 1,4-dihydroxy anthraquinone added to the polymerizable polyol(allyl carbonate) liquid monomer is an effective amount, i.e., an amount such that the resulting polymerizate will absorb at least 94 percent of the ultraviolet and visible light spectrum through 530 nanometers. Typically, from above 0.05 to about 0.30 or 0.40 weight percent of 1,4-dihydroxy anthraquinone will be sufficient to provide the above-described light filtering characteristic. More typically from above 0.05, e.g., 0.075, to about 0.20 or 0.25 weight percent of the 1,4dihydroxy anthraquinone is used. When used in the aforesaid typical amounts, at least 94, preferably 95 or 96, percent of ultraviolet and visible light through 530 nanometers are selectively absorbed by a 2.2 millimeter thick polymerizate.

The exact amount of 1,4-dihydroxy anthraquinone required to provide a polymerizate that absorbs a prescribed level of the ultraviolet and visible light spectrum through 530 nanometers, e.g., 95 percent, will depend on the thickness of the polymerizate. The thicker the polymerizate, the less 1,4-dihydroxyanthraquinone required to obtain the desired percent of light absorption and vice versa. Thus, the concentration of 1,4-dihydroxy anthraquinone can be varied within the aforedescribed range in order to obtain a level of light absorption within the range of 94-100 percent for light less than 530 nanometers for a polymerizate of a particular thickness.

Polyol (allyl carbonate) monomers which may be utilized in the practice of the present invention are the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113. In the latter patent, the monomers are prepared by treating the polyol, e.g., glycol, with phosgene at temperatures between 0° C. and 20° C. to form the corresponding polychloroformate, e.g., dichloroformate. The polychloroformate is then reacted with an unsaturated alcohol in the presence of a suitable acid acceptor, e.g., pyridine, a tertiary amine, or an alkali or alkaline earth metal hydroxide. Alternatively, the unsaturated alcohol can be reacted with phosgene and the resulting chloroformate reacted with the polyol in the presence of an alkaline reagent, as described in U.S. Pat. No. 2,370,567.

The polyol (allyl carbonate) monomers can be represented by the graphic formula:

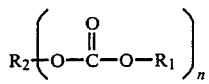

wherein $R_1$ is the radical derived from the unsaturated alcohol and is an allyl or substituted allyl group, R is the radical derived from the polyol and n is a whole number from 2 to 5, preferably 2. The allyl group ($R_1$) can be substituted at the 2 position with a halogen, most notably chlorine or bromine, or an alkyl group containing from 1 to 4 carbon atoms, generally a methyl or ethyl group. The $R_1$ radical can be represented by the graphic formula:

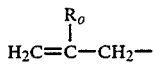

wherein $R_o$ is hydrogen, halogen, or a $C_1$-$C_4$ alkyl group. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly $R_1$ is the allyl group, $H_2C=CH-CH_2-$.

$R_2$ is a polyvalent radical derived from the polyol, which can be an aliphatic or aromatic polyol that contains 2, 3, 4, or 5 hydroxy groups. Typically, the polyol contains 2 hydroxy groups, i.e., a glycol or a bisphenol. The aliphatic polyol can be linear or branched and contain from 2 to 10 carbon atoms. Commonly, the aliphatic polyol is an alkylene glycol having from 2 to 4 carbon atoms or a poly($C_2$-$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

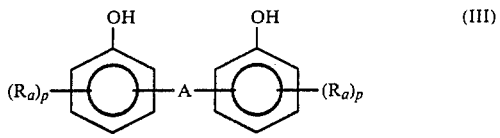

wherein A is a divalent alkyl radical, e.g., an alkylidene radical, having from 1 to 4 carbon atoms, e.g., methylene, ethylidene, dimethylmethylene (isopropylidene), Ra represents lower alkyl substituents of from 1 to 3 carbon atoms, and p is 0, 1, 2, or 3. Preferably, the hydroxyl group is in the ortho or para position.

Specific examples of the radical $R_2$ include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$; alkylene polyether groups such as $-CH_2CH_2-O-CH_2CH_2-O-CH_2CH_2-$ and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2-$; and isopropylidene bis(paraphenyl),

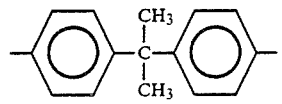

Most commonly, $R_2$ is $-CH_2CH_2-$, $-CH_2CH_2-O-CH_2CH_2-$, or $-CH_2CH_2-O-CH_2CH_2-O-CH_2CH_2-$.

Preferred are the bis(allyl carbonate) monomers which can be represented by the graphic formula:

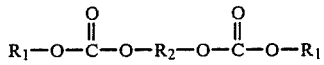

wherein $R_1$ and $R_2$ are as defined above.

Specific examples of polyol(allyl carbonate) monomers useful in the practice of the invention herein contemplated include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3butanediol bis(allyl carbonate), 1,4-butanediol bis(2,-bromoallyl carbonate), dipropylene glycol bis(allyl carbonate), trimethylene glycol bis(2-ethylallyl carbonate), pentamethylene glycol bis(allyl carbonate), ns isopropylidene bisphenol bis(allyl carbonate).

Industrially important polyol bis(allyl carbonate) monomers which can be utilized in the invention herein contemplated are:

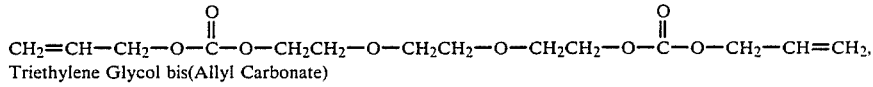
Triethylene Glycol bis(Allyl Carbonate)

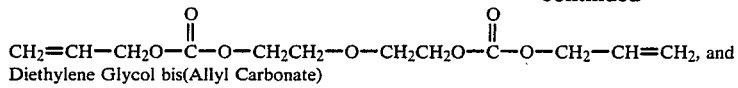
Diethylene Glycol bis(Allyl Carbonate)

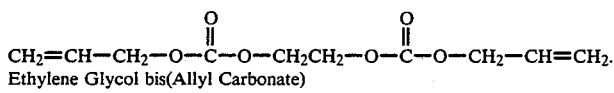
Ethylene Glycol bis(Allyl Carbonate)

Diethylene glycol bis(allyl carbonate) is preferred. This monomer is commercially available from PPG Industries, Inc. and is sold under the trademark CR-39 Allyl Diglycol Carbonate.

Because of the process by which the polyol(allyl carbonate) monomer is prepared, i.e., by phosgenation of the polyol (or allyl alcohol) and subsequent esterification by the allyl alcohol (or polyol), the monomer product can contain related monomer species in which the moiety connecting the allyl carbonate groups contains one or more carbonate groups. When the polyol is a diol, these related monomer species can be represented by the graphic formula:

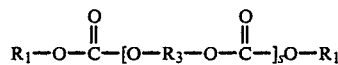

wherein $R_1$ is as defined above with respect to graphic formula I, $R_3$ is a divalent radical, e.g., alkylene or phenylene, derived from the diol, and s is a whole number from 2 to 5. The related monomer species of diethylene glycol bis(allyl carbonate) can be represented by the graphic formula,

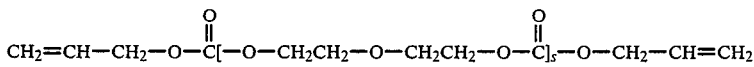

wherein s is a whole number from 2 to 5. The polyol(allyl carbonate) monomer can typically contain from 2 to 20 weight percent of the related monomer species and such related monomer species can be present as mixtures, i.e., mixtures of the species represented by s being equal to 2 3, 4 etc.

In addition, a partially polymerized form of the polyol(allyl carbonate) monomer can be used. In that embodiment, the monomer is partially polymerized by using small, e.g., 0.5–1.5 phm, amounts of initiator or thickened by heating to provide a non-gel containing, more viscous monomeric material.

As used in the present description and claims, the term polyol(allyl carbonate) monomer or like names, e.g., diethylene glycol bis(allyl carbonate), are intended to mean and include the named monomer or prepolymer and any related monomer species contained therein.

Other copolymerizable monomeric materials may also be present with the polyol(allyl carbonate) monomer. For example, a viscosity increasing monomeric material may be dispersed in the monomer, as described in U.S. Pat. No. 4,346,197. Other materials such as allyl S-triazines and urethanes having acrylate functionality, as described in U.S. Pat. No. 4,360,653, may be present in the monomer to modify the ultimate physical and thermal properties of the polymer. U.S. Pat. No. 4,139,578 describes the presence of unsaturated polyester and unsaturated copolymerizable monomer to decrease the shrinkage that occurs during polymerization of polyol(allyl carbonate) monomers. Hence, as herein contemplated, the polyol(allyl carbonate) monomer to be polymerized may also contain minor, e.g., less than 50 weight percent, of other copolymerizable materials which are used to modify the ultimate properties or processing characteristics of the polyol(allyl carbonate) monomer.

The polymerizable polyol(allyl carbonate) monomer containing 1,4-dihydroxy anthraquinone can be prepared by admixing the two materials in a suitable vessel at room temperature. The rate of dissolution of the 1,4-dihydroxy anthraquinone can be increased by heating the polymerizable monomer, e.g., up to 50–60° C. Alternatively, the 1,4-dihydroxy anthraquinone can be dissolved in the monomer up to its solubility limit to thereby form a concentrate which can then be diluted with the polyol(allyl carbonate) monomer to provide a polymerizable mixture containing the desired amount of 1,4-dihydroxy anthraquinone. For example, a 1.6 percent concentrate of 1,4-dihydroxy anthraquinone in diethylene glycol bis (allyl carbonate) monomer can be prepared by heating the appropriate mixture of the anthraquinone and monomer to 80–90° C. with agitation. A casting solution containing 0.20 weight percent of the anthraquinone can then be prepared by blending 1 part of the hot concentrate with 7 parts of monomer.

Polymerization of the 1,4-dihydroxy anthraquinone - containing polyol(allyl carbonate) polymerizable monomer is effected by adding a free-radical initiator, e.g., a peroxide initiator, to the mixture and heating the mixture. Such organic peroxides are well known in the art. Preferred free-radical initiators are organic peroxy compounds, such as peroxyesters, diacyl peroxides, peroxydicarbonates and mixtures of such peroxy compounds.

Examples of peroxy compounds include: peroxydicarbonate esters such as di(n-propyl)-, diisopropyl-, di(n-butyl)-, di(secondary butyl)-, diisobutyl-, di(2-ethylhexyl)-, dicetyl-, dicyclohexyl- and di(4-tertiarybutyl cyclohexyl) peroxydicarbonate; diacyl peroxides such as diacetyl-, dibenzoyl-, dilauroyl-, and diisobutyryl peroxide; and peroxyesters such as tertiarybutyl peroxypivalate, tertiarybutyl peroctoate and tertiarybutyl perneodecanoate.

The amount of peroxide initiator can vary but generally will be an initiating amount, i.e., an amount sufficient to produce a fully cured solid polymerizate utilizing the time period and temperatures of the cure cycle chosen. The amount of peroxide initiator used will typically vary from about 2.0–10.0 parts of peroxide per hundred parts of monomer. More typically, from about 3.0 to 5, e.g., 3.5, parts of peroxide per hundred parts of monomer (phm) are used.

The polyol(allyl carbonate) monomer may be polymerized in an air oven or in a water bath. The time of polymerization, or cycle, is a function of the rate at which the heat of polymerization can be removed, which depends on the thickness of the article to be produced. A complete discussion of the time-temperature relationship for cure cycles of diethylene glycol bis(allyl carbonate) can be found in the article, "Polymerization Control In Casting A Thermosetting Resin" by William R. Dial et al, Industrial and Engineering Chemistry, Volume 47, page 2447-51, December 1955.

In one exemplification of the present invention, 0.20 weight percent of 1,4-dihydroxy anthraquinone is added to diethylene glycol bis(allyl carbonate) and the resulting mixture polymerized by the addition of 3.5 weight percent diisopropyl peroxydicarbonate. The resulting polymerizate has an orange hue, is optically clear and haze free, and absorbs greater than 95 percent of all incident light and radiation below 530 nanometers, i.e., from 200-530 nanometers.

The present invention is more particularly described in the following examples, which are intended as illustrative only since numerous modifications and variations therein will be apparent to those skilled in the art. In the examples, polymerization products are tested for the following properties using the physical test methods hereinafter described.

1. Light transmission and haze—The percent light transmission and percent haze are measured using a Hunter lab colorimeter, Model D25P-2; and 2. Barcol hardness—This property is measured in accordance with ASTM Test Method D2583-81 using a Barcol impressor.

EXAMPLE I

Diethylene glycol bis(allyl carbonate) (200 grams) was charged to a beaker and 0.40 grams of 1,4-dihydroxy anthraquinone added to the beaker. The contents of the beaker were heated to about 50° C. with mixing for about 15-30 minutes to dissolve the anthraquinone additive. The resulting solution was cooled to ambient temperature and then filtered through a 5 micron membrane. Diisopropyl peroxydicarbonate (3.50 weight percent) was added to the cooled, filtered solution and the mixture injected into a mold formed by two 4 inch×4 inch (10.2×10.2 centimeters) glass plates separated by a 2.2 millimeter ethylene vinyl acetate gasket. The mold was then heated gradually from about 44° C. to 90° C. over a period of 16 ½ hours. Thereafter, the temperature of the mold was increased to 105° C. over 20 minutes and the mold maintained at that temperature for an additional 10 minutes.

Figure 2:
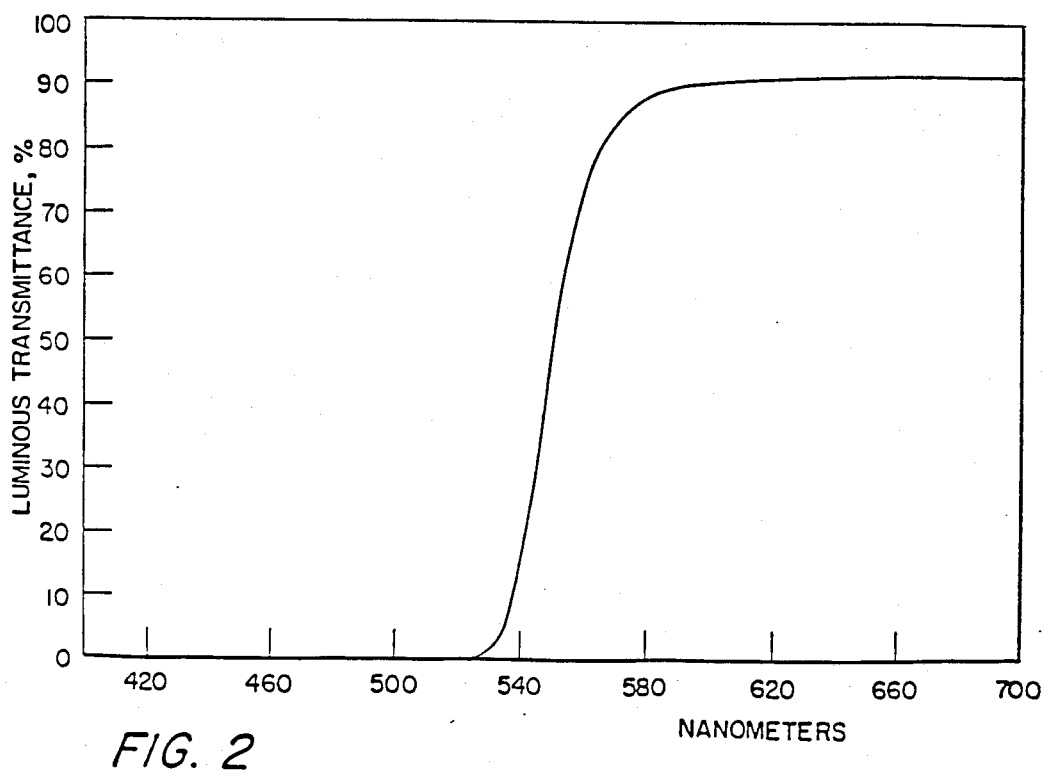
FIGS. 2, 3, 4 and 5 are plots of the percent light transmittance against wavelength for the electromagnetic spectrum from about 400 to 700 nanometers for poly[diethylene glycol bis(allyl carbonate)] containing about 0.20, 0.15, 0.10, and 0.05 weight percent respectively of 1,4-dihydroxy anthraquinone.

While still hot, the glass plates of the mold were separated. The resulting polymeric sheet casting was tested for Barcol hardness, haze and light transmittance. A summary of results are tabulated in Table I and the portion of the transmission spectra in the range of from about 520 to 700 nanometers depicted in FIG. 2.

EXAMPLE II

Figure 3:
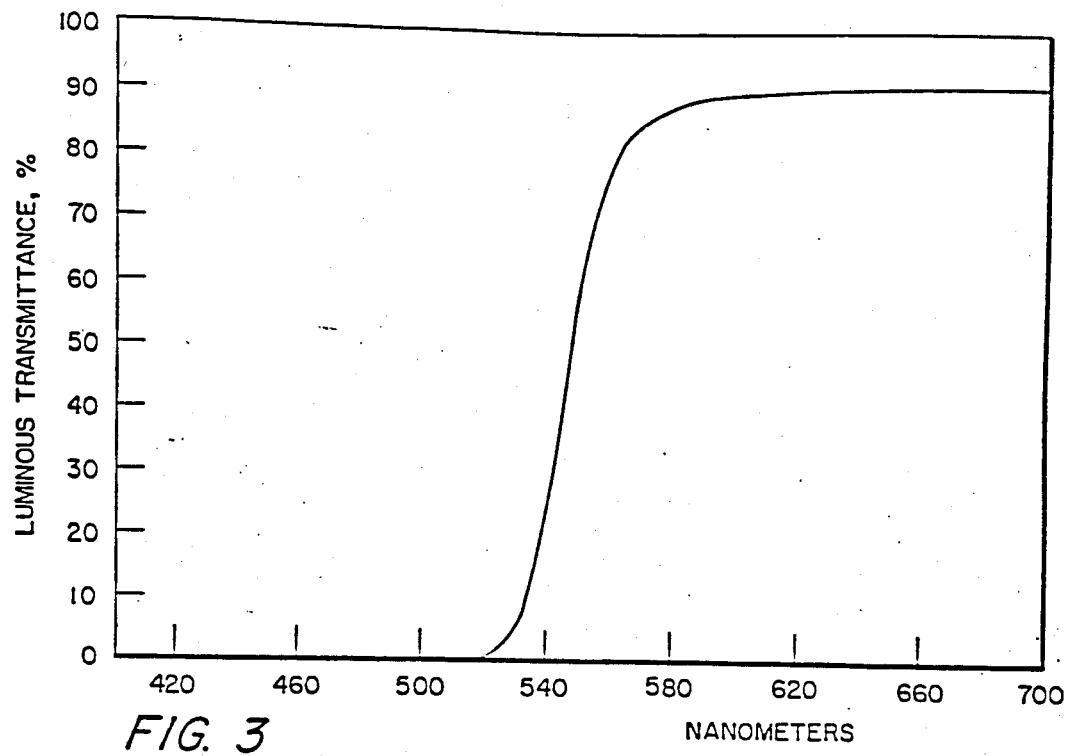
Figure 4:
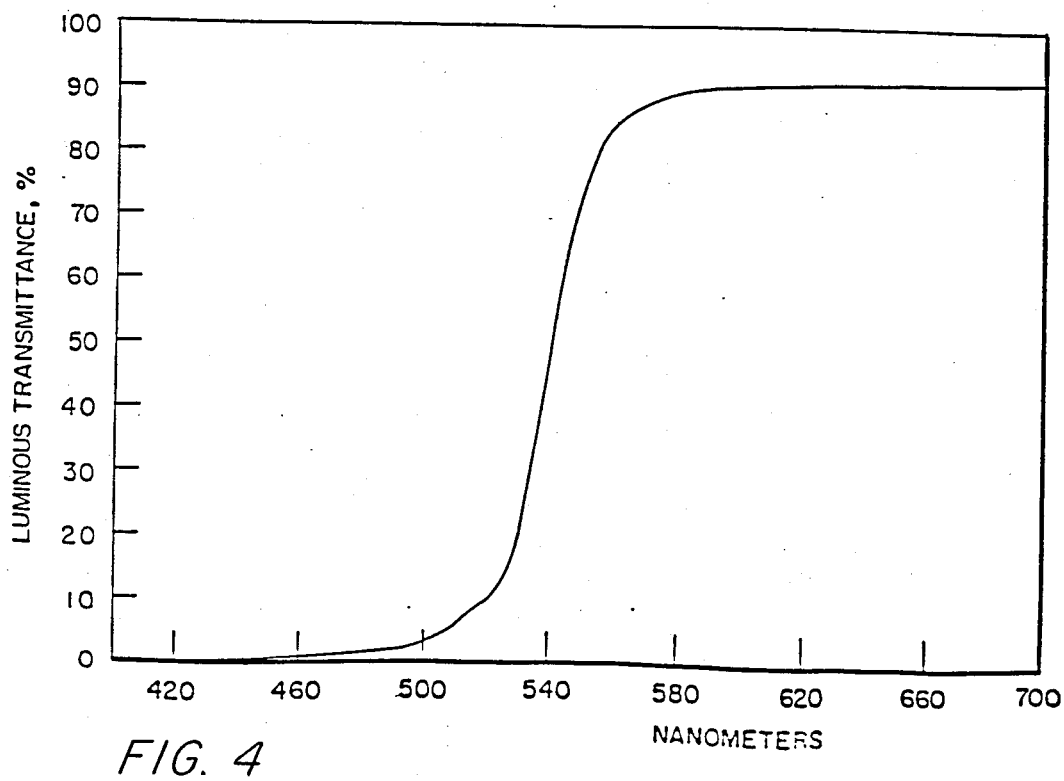
Figure 5:
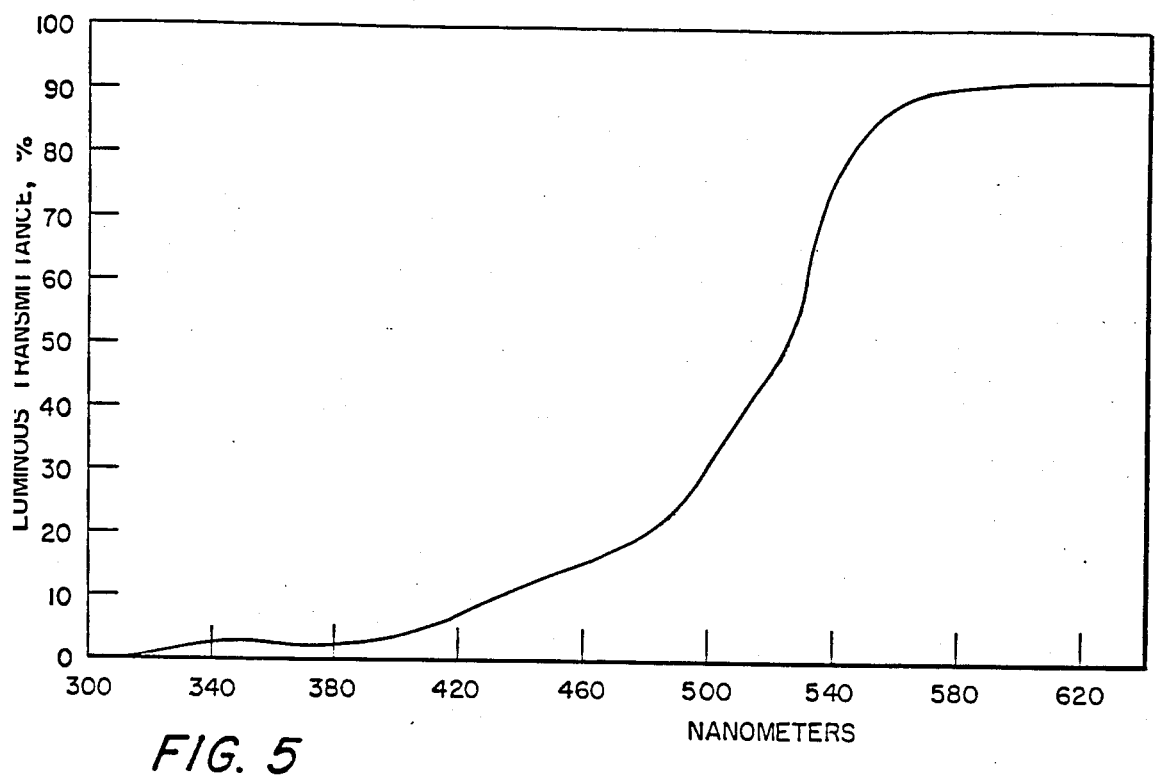

The procedure of Example I was repeated three times while varying the amount of 1,4-dihydroxy anthraquinone. The amount of 1,4-dihydroxy anthraquinone used was 0.15 weight percent, 0.10 and 0.05 weight percent respectively in the three-repetitions. The data obtained is tabulated in Table I and the appropriate portion of each of the generated transmission spectra from about 200 to 700 nanometers for the resulting polymerizates is depicted in FIGS. 3, (0.15 wt. %) 4, (0.10 wt. %) and 5 (0.05 wt. %).

EXAMPLE III (Comparative)

The procedure of Example I was repeated except that no 1,4-dihydroxy anthraquinone was added to the diethylene glycol bis(allyl carbonate). The data obtained is tabulated in Table I and the portion of the generated transmission spectra from about 260 to 600 nanometers depicted in FIG. 1.

TABLE I

| Example | 1,4-Dihydroxy Anthraquinone, wt. % | Luminous Transmittance, % Wavelength, nm | | | | | | | Visible (White Light) Transmission, % | Haze, % | Barcol Hardness 15 sec. |
|---|---|---|---|---|---|---|---|---|---|---|---|
| | | 300-400 | 401-499 | 500 | 520 | 540 | 560 | 600-700 | | | |
| I | 0.20 | <1 | <1 | <1 | <1 | 16 | 73 | 90-91 | 50.3 | 1.2 | 17 |
| II (a) | 0.15 | <1 | <1 | <1 | 2 | 27 | 77 | 90-91 | 53.3 | 1.1 | 20 |
| II (b) | 0.10 | <1 | ≦3 | 3 | 10 | 52 | 82 | 90-91 | 59.6 | 1.3 | 23 |
| II (c) | 0.05 | <1 | ≦30 | 30 | 45 | 73 | 87 | 90-91 | 73.3 | 0.8 | 26 |
| III | 0 | ≦91 | 91 | 91 | 91 | 91 | 91 | 92 | 92.6 | 0.6 | 26 |

The data of Table I and FIGS. 1-5 show that the addition of low levels of 1,4-dihydroxy anthraquinone has a dramatic effect on the ultraviolet and visible transmittance of the cast polymerizate. A 0.20 weight percent level of that anthraquinone additive effectively absorbs ultraviolet and visible radiation between 300 and 520 nanometers. Lower concentrations will produce various alterations of the transmission curves. A lens prepared from such a polymerizate would protect portions of the eye from potentially harmful photochemical damage from near ultraviolet and/or blue light. Beyond about 520-530 nanometers, the begin to transmit some green, yellow, orange, and red light, eventually reaching at least 90 percent transmittance at about 600 nanometers. Further, the castings demonstrate good cure and optical properties. The levels of haze and Barcol hardness exhibited by the castings are well within acceptable ranges. Finally, the castings exhibit reduced transmission of visible or white light.

Articles prepared from the compositions of the present invention may be used in those applications which require filtration of light radiation of wave lengths below about 530 nanometers. In particular, polymerizates of the present invention may be used as ophthalmic lenses for individuals that are sensitive to visible light and ultraviolet energy below the wave length of 530 nanometers, or for general sunglass applications.

Although the present invention has been described with reference to specific details of certain embodiments thereof, it is not intended that such details should be regarded as limitations upon the scope of the invention except as and to the extent that they are included in the accompanying claims.

I claim:

1. A polyol(allyl carbonate) polymerizate that contains 1,4-dihydroxy anthraquinone in amounts such that the polymerizate absorbs at least 94 percent of the visible and ultraviolet light segments of the electromagnetic spectrum below the wavelength of 530 nanometers, and that has been prepared by polymerizing a mixture of 1,4-dihydroxy anthraquinone and liquid polyol(allyl carbonate) monomer.

2. An ophthalmic article of poly[diethylene glycol bis(allyl carbonate)] that contains from above 0.05 to about 0.40 weight percent, 1,4-dihydroxy anthraquinone, the anthraquinone being present in amounts such that the article selectively absorbs at least 94 percent of the visible and ultraviolet light segments of the electromagnetic spectrum below the wavelength of 530 nanometers, and that has been prepared by polymerizing a mixture of 1,4-dihydroxy anthraquinone and liquid poly[diethylene glycol bis(allyl carbonate)].

3. The polymerizate of claim 1 wherein the anthraquinone is present in amounts of from above 0.05 to about 0.40 weight percent.

4. The polymerizate of claim 3 wherein the polyol(allyl carbonate) is represented by the following graphic formula,

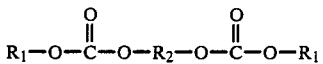

wherein $R_2$ is an alkylene glycol having from 2 to 4 carbon atoms or a poly($C_2$-$C_4$) alkylene glycol, and $R_1$ is the allyl radical,

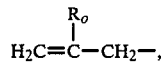

wherein $R_o$ is hydrogen, halogen or a $C_1$-$C_4$ alkyl

5. The polymerizate of claim 4 wherein the polyol(ally carbonate) is diethylene glycol bis(allyl carbonate).

6. The article of claim 2 wherein the article is an ophthalmic lens.

7. The article of claim 2 wherein the article contains from about 0.075 to about 0.25 weight percent of 1,4-dihydroxy anthraquinone.

* * * * *